(12) United States Patent
Loran et al.

(10) Patent No.: US 9,915,297 B2
(45) Date of Patent: Mar. 13, 2018

(54) CLUTCH DEVICE HAVING INTERCONNECTED PLATES

(71) Applicant: Schaeffler Technologies AG & Co. KG, Herzogenaurach (DE)

(72) Inventors: Igor Loran, Lichtenau (DE); Christoph Raber, Ottweiler-Steinbach (DE); Christoph Wittmann, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 74 days.

(21) Appl. No.: 14/440,472

(22) PCT Filed: Oct. 14, 2013

(86) PCT No.: PCT/DE2013/200223
§ 371 (c)(1),
(2) Date: May 4, 2015

(87) PCT Pub. No.: WO2014/071933
PCT Pub. Date: May 15, 2014

(65) Prior Publication Data
US 2015/0300419 A1    Oct. 22, 2015

(30) Foreign Application Priority Data

Nov. 9, 2012    (DE) .................... 10 2012 220 460

(51) Int. Cl.
*F16D 13/58*    (2006.01)

(52) U.S. Cl.
CPC ................ *F16D 13/585* (2013.01)

(58) Field of Classification Search
CPC ..................................................... F16D 13/585
See application file for complete search history.

(56) References Cited

U.S. PATENT DOCUMENTS

| | | | | |
|---|---|---|---|---|
| 1,939,888 A | * | 12/1933 | Fink ............... | F16D 13/585 192/52.4 |
| 2,222,508 A | * | 11/1940 | Hunt ............... | F16D 13/585 192/70.27 |
| 4,865,174 A | * | 9/1989 | Takeuchi ........ | F16D 13/585 192/109 R |
| 5,301,782 A | * | 4/1994 | de Briel ......... | F16D 13/585 192/70.27 |
| 5,409,091 A | | 4/1995 | Reik et al. | |
| 5,476,166 A | | 12/1995 | Schierling et al. | |
| 5,520,274 A | | 5/1996 | Huber | |

(Continued)

FOREIGN PATENT DOCUMENTS

| | | |
|---|---|---|
| DE | 4020251 | 1/1995 |
| DE | 102013200556 | 7/2013 |

(Continued)

*Primary Examiner* — Huan Le
*Assistant Examiner* — Lori Wu
(74) *Attorney, Agent, or Firm* — Volpe and Koenig, P.C.

(57) ABSTRACT

A clutch device has a counter-pressure plate and a contact plate which is movable to a limited extent in an axial direction of the clutch device by at least one lever element to clamp a clutch plate frictionally between the counter-pressure plate and the contact plate, wherein the counter-pressure plate has at least one strap segment extending essentially in an axial direction, to which a cover component is connected.

10 Claims, 3 Drawing Sheets

(56) References Cited

U.S. PATENT DOCUMENTS

| | | | |
|---|---|---|---|
| 5,647,468 A | 7/1997 | Villata et al. | |
| 6,176,361 B1 | 1/2001 | Travers et al. | |
| 6,789,656 B2 * | 9/2004 | Uenohara | F16D 13/757 192/111.2 |
| 2002/0070090 A1 | 6/2002 | Vogt | |
| 2004/0163923 A1 * | 8/2004 | Ijames | F16D 43/12 192/99 A |
| 2010/0258399 A1 * | 10/2010 | Simon | F16D 13/585 192/70.252 |
| 2011/0272236 A1 * | 11/2011 | Okazaki | F16D 13/56 192/66.31 |
| 2012/0247909 A1 * | 10/2012 | McCutcheon | F16D 13/385 192/70.28 |
| 2015/0159706 A1 * | 6/2015 | Funfgeld | F16D 13/583 192/48.8 |

FOREIGN PATENT DOCUMENTS

| | | | |
|---|---|---|---|
| EP | 2028381 | 2/2009 | |
| EP | 2048397 | 4/2009 | |
| FR | 2756892 | 6/1998 | |
| WO | 2012146225 | 11/2012 | |
| WO | WO 2013139571 A1 * | 9/2013 | F16D 13/58 |

\* cited by examiner

CLUTCH DEVICE HAVING INTERCONNECTED PLATES

BACKGROUND

The present invention relates to a clutch device, in particular for a drivetrain of a motor vehicle.

From DE 44 20 251 A1 a clutch device is known, having a counter-pressure plate and a contact plate that is axially movable to a limited extent in an axial direction of the clutch device by a diaphragm spring, to frictionally clamp a clutch plate between the counter-pressure plate and the contact plate. A clutch cover has a plurality of strap segments, whereby the cup spring is attached tiltably to the clutch cover with two wire rings interposed.

It is the object of the present invention to specify an adequately rigid clutch device which can be produced at a reasonable cost.

SUMMARY

According to the invention, this object is fulfilled by a clutch device having a counter-pressure plate and a contact plate which is movable to a limited extent in an axial direction of the clutch device by at least one lever element, to clamp a clutch plate frictionally between the counter-pressure plate and the contact plate, wherein the counter-pressure plate has at least one strap segment extending essentially in an axial direction, to which a cover component is connected.

The clutch device is particularly suited for a drivetrain of a motor vehicle.

By means of the strap segment, which is designed in a single piece with the counter-pressure plate, and by means of the cover component which is connected to the strap segment, the clutch device can on the one hand be produced economically, and on the other hand has sufficient stability due to the cover component. Furthermore, a clutch device is usually assembled using opposing force, in particular when replacing a different clutch device, for example in workshops, which can result in a deformation of the clutch cover. This deformation causes the operating point of the clutch device to be displaced, which can be compensated for in very few workshops. Since in the clutch device according to the invention the clutch cover is connected to the strap segment, which extends in an axial direction, the clutch device according to the invention has sufficient rigidity, and is especially well suited for repair use in workshops.

Preferred exemplary embodiments of the present invention are explained in the subordinate claims.

The counter-pressure plate preferably has a friction surface, with which the clutch plate can be brought into frictional contact when the clutch device is engaged. The cover component is situated on a face of the strap segment, which extends essentially at right angles to the friction surface of the counter-pressure plate. The cover component is preferably in direct contact with the face of the strap segment. The strap segment is preferably produced by means of a single-stage or multiple-stage shaping process, it being particularly advantageous if the entire counter-pressure plate is produced by means of shaping from a sheet metal blank, in particular a sheet steel blank. This enables an especially economical production of the clutch device.

It is possible for the clutch device to have only a single, integral lever element. In a normally engaged clutch device this lever element may be designed as an essentially ring-shaped diaphragm spring, and in a normally disengaged clutch device it may be designed as an essentially ring-shaped lever spring. It is also possible for the clutch device to have a plurality of separate lever elements, spaced apart from each other in the circumferential direction. Common to all of the lever elements named above is the fact that they each have at least one lever tongue, by which the lever element or lever elements is or are operable, i.e. tiltable, to disengage and/or to engage the clutch device. The lever tongues are preferably arranged in the radial direction within the clutch device, in particular preferably close to the center of rotation of the clutch device.

According to a preferred exemplary embodiment, the counter-pressure plate has a plurality of strap segments spaced apart from each other in the circumferential direction of the clutch device, which are formed in a single piece with the counter-pressure plate and are arranged on a circular path. Preferably, the strap segments are spaced at uniform intervals from each other in the circumferential direction, whereby a uniform engaging behavior and/or disengaging behavior of the clutch device can be achieved.

It is advantageous if the strap segments are positioned in the radial direction outside of a friction surface of the counter-pressure plate. This makes possible, on the one hand, an especially compact configuration of the clutch device, and on the other hand, advantageous bracing of the lever element or lever elements.

In addition, it is advantageous if a separate lever element is tiltably supported by each strap segment. Thus it is possible to dispense with a complexly constructed, ring-shaped lever element having a plurality of lever tongues positioned inside in the radial direction. The separate lever elements can be produced and assembled inexpensively.

According to an especially preferred exemplary embodiment, a hole is made in the face of the strap segment, by means of which the cover component is connectible to the counter-pressure plate. The hole is preferably a blind hole. In particular, it is advantageous if the hole, in particular the blind hole, is punched in the face of the strap section by means of an awl. This makes it possible to produce the clutch device especially economically, since machining processes can be dispensed with when making the hole.

Furthermore, it is advantageous if the cover segment is connected to the counter-pressure plate by means of a screw inserted into the hole. The screw is preferably a self-tapping screw, making it unnecessary to cut threading in the hole in a separate procedural step. This too enables a reduction in the production costs of the clutch device.

According to another preferred exemplary embodiment, the strap segment extends through the contact plate in an axial direction. The strap segment for transmitting torque to the contact plate lies in an aperture in the contact plate. The contact plate aperture is situated in particular in the radial direction outside of a friction surface of the contact plate, with which the clutch plate may be brought into frictionally engaged contact when the clutch device is engaged. It is advantageous if the contact plate has a number of apertures corresponding to the number and positions of the strap segments, at the positions corresponding to the strap segments. The apertures are therefore preferably positioned evenly spaced from each other on a circular path in the circumferential direction.

For transferring torque, it is beneficial if flanks of the particular strap segment which lie opposite each other in the circumferential direction are in direct contact with edges of the respective aperture of the contact plate. In this contact, it should be noted that a clearance fit is advantageous, in order to favor the axial movability of the contact plate relative to the counter-pressure plate and at the same time to transmit the torque. It is also possible for additional components or segments of components to be situated in the circumferential direction between the respective flank of the strap segment and the respective edge of the aperture.

The strap segment preferably extends in the axial direction through the lever element. Also advantageously, the lever element is aligned, at least in the circumferential direction, by resting against the strap segment. This too makes torque transmission possible, in particular by means of clearance fitting.

According to another preferred exemplary embodiment, the lever element has at least one spring segment, which is engaged with the cover component to pre-tension the lever element and/or to center the lever element. To this end, the cover component is equipped, for example, with an engagement opening, with which a free end of the spring segment provided with a hook segment engages. In particular, the engagement opening in the cover component and the collar segment of the lever element form a retention device, in order to hold the lever element securely on the cover component, which is especially advantageous when assembling the clutch device. As the term "spring segment" indicates, the spring segment of the lever element has greater elasticity than the other regions of the lever element, in particular the previously mentioned lever tongues and the lever arms which will be explained below.

It is advantageous if the cover component is ring-shaped. In particular, it is advantageous if at least one centering segment which centers the lever element, extending in the axial direction and/or in the radial direction of the clutch device, is provided on the cover component. This centering segment is preferably formed on an inner edge of the ring-shaped cover component. Furthermore, this centering segment preferably engages with the lever element, in particular preferably with an indentation between two adjacent lever arms of the lever element. In this case, it is advantageous if the previously mentioned spring segment of the lever element is located in this indentation, which lever element for its part rests against the cover component under pre-tensioning and in particular engages with the engagement opening in the cover component, which is located on the same radial line as the centering segment.

According to another exemplary embodiment, the lever element has at least one lever arm, which engages with the contact plate. Preferably, the lever arm engages with the contact plate in order to disengage the clutch device, when the lever tongue of the lever element is actuated by the actuator device. The lever arm preferably engages in particular with a collar segment of the contact plate, formed toward the outside in the radial direction. The collar segment extends in the axial direction of the clutch device, and is preferably produced by means of shaping. This makes it possible to make the contact plate from a metal sheet, in particular a sheet steel blank, which can further reduce the production costs of the clutch device.

The collar segment is preferably formed in a continuous circle in the circumferential direction, and is provided with corresponding engagement openings for the lever elements, more precisely the lever arms of the lever elements. These engagement openings may be made separately from the apertures through which the counter-pressure plate strap segments extend in the axial direction, but are preferably made as a common engagement opening and aperture for each lever element. The outer collar segment thus forms a lifting anchor for the lever elements of the preferably normally disengaged clutch device. Furthermore it is also possible, by means of an appropriate configuration, to transmit the torque coming from the strap segment of the counter-pressure plate to the contact plate partially or completely through the lever arms of the lever elements, through the contact of the lever arms in the engagement openings.

According to another preferred exemplary embodiment, a ring-shaped diaphragm spring is situated between the lever element and the contact plate to pre-tension the contact plate in the axial direction. The diaphragm spring is preferably in contact with the radially outer region of the lever element, and with the radially inner region of the contact plate. It is particularly advantageous here if the contact plate has a bead, preferably a plurality of beads spaced apart from each other in the circumferential direction, for the diaphragm spring to rest against. It is also advantageous if the diaphragm spring is centered by a collar segment of the contact plate which is formed toward the inside in the radial direction and extends in the axial direction. The collar segment is preferably made by means of shaping, so that the contact plate can be produced in an economical manner from a metal sheet, in particular a sheet steel blank.

According to a preferred exemplary embodiment, the diaphragm spring is situated in the radial direction within the strap segments positioned on a circular path. This makes an especially compact configuration of the clutch device possible.

It is advantageous if the counter-pressure plate has at least one fastening segment for a non-rotating connection to an input component, preferably a flywheel or the secondary mass of a dual-mass flywheel. For example, the connection may be made in the form of one or more riveted connections.

According to a preferred exemplary embodiment, the counter-pressure plate has a plurality of strap segments spaced apart from each other in the circumferential direction, preferably uniformly, which are formed in a single piece with the counter-pressure plate and are arranged on a circular path. This makes it possible for the number of components to be further reduced.

In addition, it is likewise advantageous if the fastening segments are positioned in the radial direction outside of the friction surface of the counter-pressure plate. This enables, on the one hand, an especially compact configuration of the clutch device, and on the other hand ensures the accessibility of the fastening segments after the clutch device is assembled.

The strap segment, or one of the strap segments, is preferably positioned in the circumferential direction between two neighboring fastening segments. By this means, the entire counter-pressure plate with its strap segments and fastening segments can be produced as a sheet metal part in one combined stamping and shaping process.

In addition, the counter-pressure plate preferably has the same number of strap segments and fastening segments, with the strap segments and the fastening segments being positioned alternately in the circumferential direction.

BRIEF DESCRIPTION OF THE DRAWINGS

The present invention will be explained in greater detail below on the basis of preferred exemplary embodiments in combination with the associated figures. They show the following.

DETAILED DESCRIPTION OF THE PREFERRED EMBODIMENTS

Figure 1:
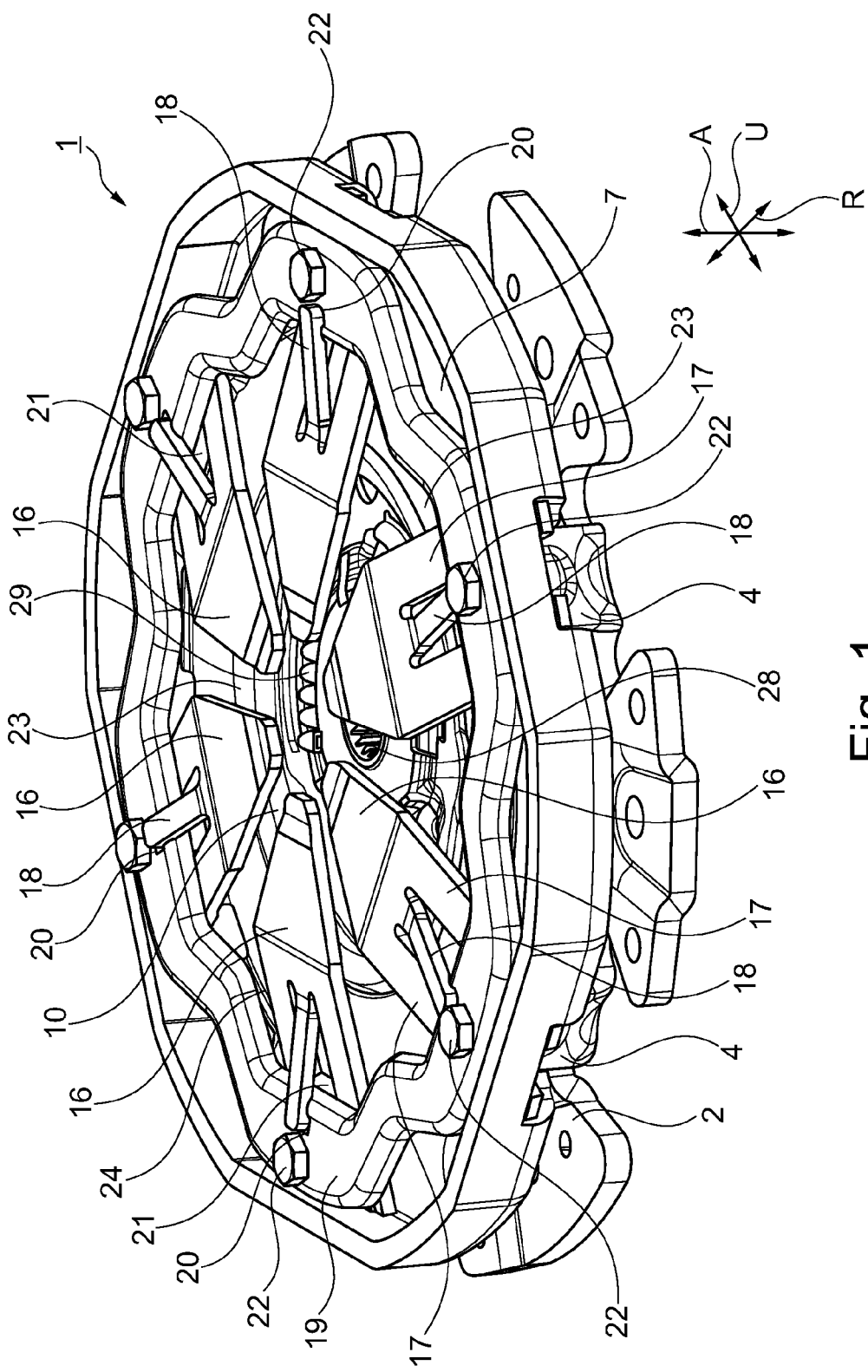
FIG. 1 an exemplary embodiment of a clutch device with a counter-pressure plate having strap segments and a contact plate having collar segments, in a perspective view, FIG. 2 the clutch device from FIG. 1 in a half-sectional view, FIG. 3 the counter-pressure plate of the clutch device from FIG. 1 in a perspective view, and FIG. 4 the contact plate of the clutch device from FIG. 1 in a perspective view.
Figure 2:
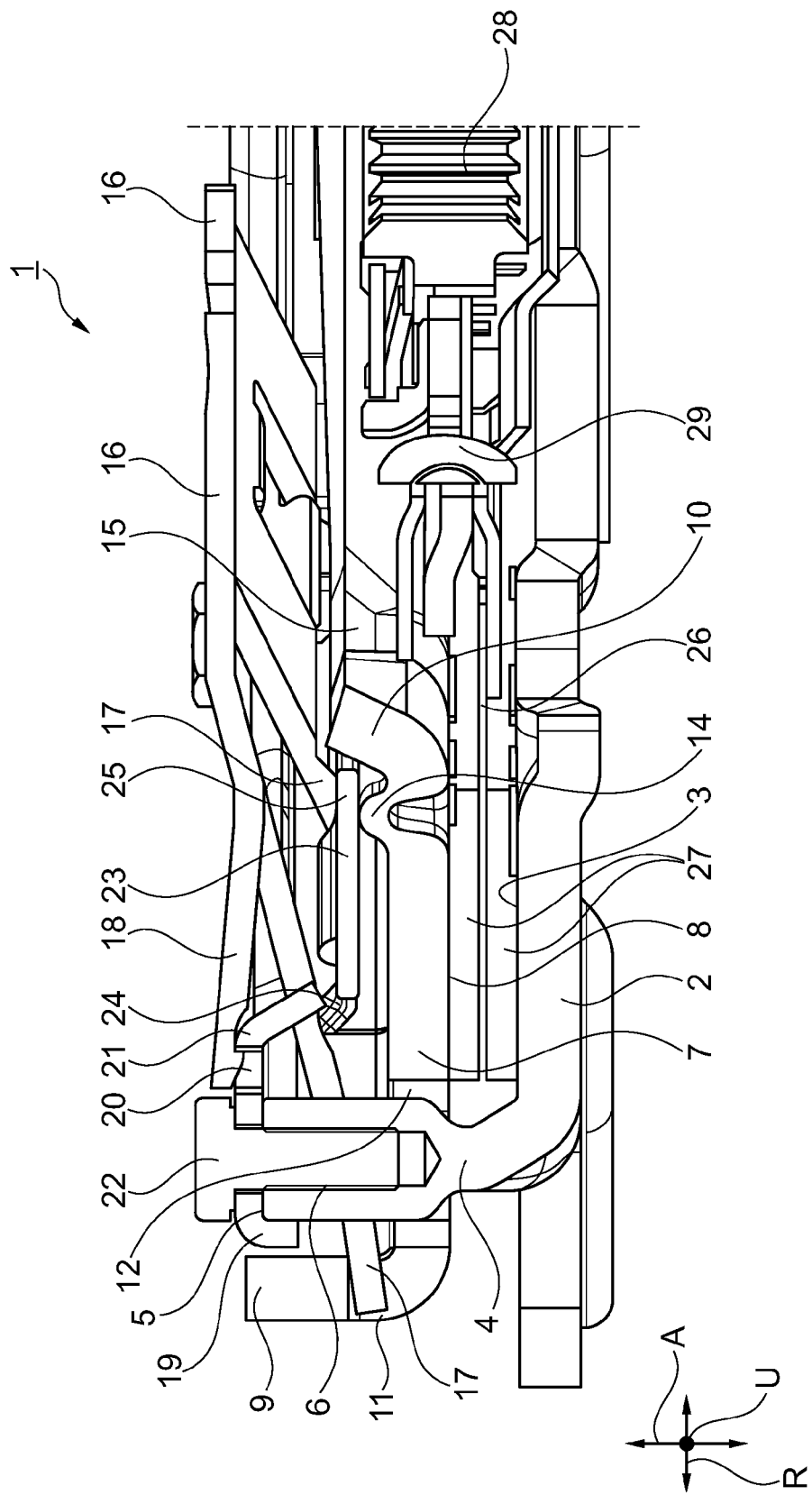
Figure 3:
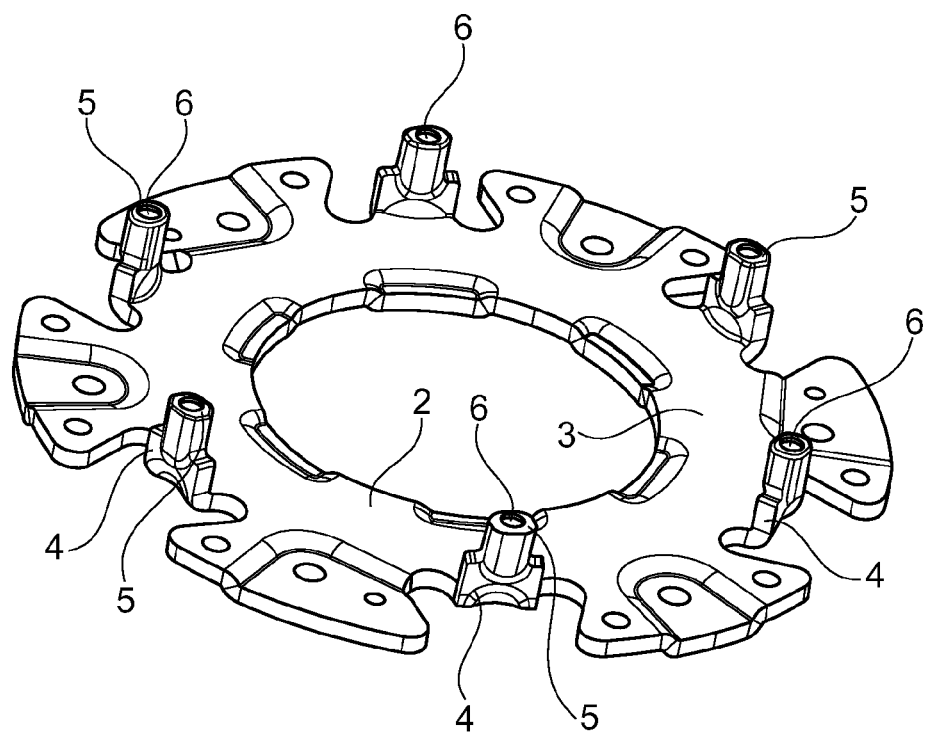
Figure 4:
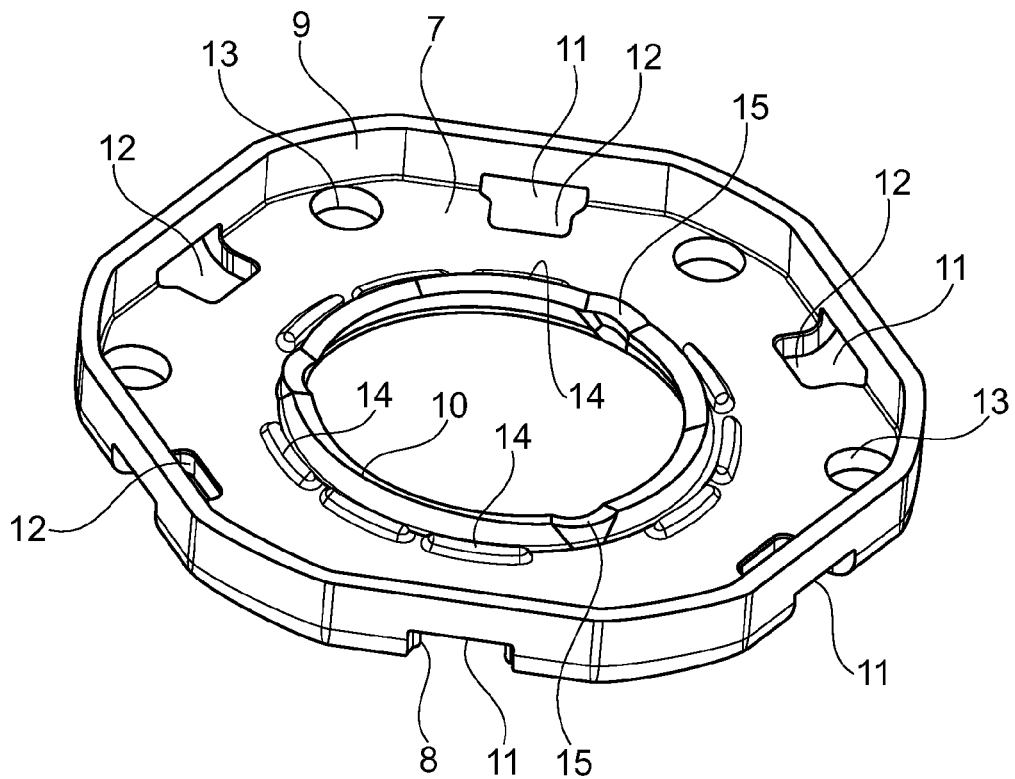

FIGS. 1 through 4 relate to a preferred exemplary embodiment of a clutch device 1. Features that are not identified in the present description as essential to the invention are to be understood as optional. The following description therefore also relates to additional exemplary embodiments of the clutch device 1 which have partial combinations of the features that will be explained below. In particular, the following description also relates to a counter-pressure plate 2 and a contact plate 7 for the clutch device 1. The clutch device 1 is designed in particular as a friction clutch, and is intended for the drivetrain of a motor vehicle.

The clutch device 1 has at least one counter-pressure plate 2, at least one contact plate 7 and at least one clutch plate 26, situated in axial direction A of clutch device 1 between the counter-pressure plate 2 and the contact plate 7. The counter-pressure plate 2 defines an input side of the clutch device 1, while the clutch plate 26 defines an output side of the clutch device 1. The contact plate 7 is mounted non-rotatingly relative to the counter-pressure plate 2, and is movable to a limited extent in axial direction A. Because of the movement of contact plate 7 in axial direction A, the clutch plate 26 is frictionally can be clamped between the counter-pressure plate 2 and the contact plate 7, more precisely between a friction surface 3 of the counter-pressure plate 2 and a friction surface 8 of the contact plate 7, by means of their friction linings, so that torque can be transmitted from the input side of the clutch device 1 to the output side of the clutch device 1.

In addition to its friction linings 27, the clutch plate 26 has a hub 28, which is situated at the center of rotation of the clutch plate 26 or at the center of rotation of the clutch device 1. Furthermore, the clutch plate 26 preferably has a damping device 29, which is situated in radial direction R of the clutch device 1 between the friction linings 27 and the hub 28, and which is designed to damp torsional vibrations which occur during operation of the clutch device 1.

In addition, the clutch device 1 has a plurality of lever elements 16, which are tiltably braced and supported relative to the counter-pressure plate 2, and which are operable by an actuator device (not shown). The individual lever elements 16 are spaced apart from each other in circumferential direction U of the clutch device 1, and extend in radial direction R of the clutch device 1. Each of the lever elements 16 has a lever tongue by which each of the lever elements is operable, i.e. tiltable, by the actuator device, to disengage and/or to engage the clutch device 1. The lever tongues are preferably positioned inside in radial direction R, i.e., close to the center of rotation of the clutch device 1. Each of the lever elements 16 is tiltably braced and supported, at least in circumferential direction U, in the area of a corresponding strap segment 4.

In the depicted exemplary embodiment, the counter-pressure plate 2 has a number of strap segments 4 which corresponds to the number of lever elements 16. The strap segments 4 are spaced at uniform intervals from each other in circumferential direction U, and are formed in a single piece with the counter-pressure plate 2. In particular, the strap segments 4 are arranged on a circular path. In radial direction R the strap segments 4 are located outside of the friction surface 3 of the counter-pressure plate 2 and outside of the friction surface 8 of the contact plate 7. Furthermore, the strap segments 6 extend essentially in axial direction A. Preferably, the strap segments 4 are formed from the otherwise flat counter-pressure plate 2 by shaping, so that the entire counter-pressure plate 2 is preferably producible by means of a combined stamping and forming process from a metal sheet, in particular a sheet steel blank.

Furthermore, the counter-pressure plate 2 has a plurality of fastening segments spaced uniformly apart from each other in circumferential direction U, which are formed in a single piece with the counter-pressure plate 2 and are arranged on a circular path. The fastening segments are positioned outside of the friction surface 3 of the counter-pressure plate 2 in radial direction R. One of the strap segments 4 is positioned between two adjacent fastening segments in circumferential direction U. In particular, in the exemplary embodiment the number of strap segments 4 corresponds to the number of fastening segments, with the strap segments 4 and the fastening segments being arranged alternately in circumferential direction U. By means of the fastening segments, the entire clutch device 1 can be connected non-rotatingly to an input component, preferably a flywheel or the secondary mass of a dual-mass flywheel, for example by means of a plurality of riveted connections or a plurality of threaded connections.

The strap segments 4 of the counter-pressure plate 2 extending in the axial direction A are connected to a cover component 19, which is of ring-shaped design in the depicted exemplary embodiment. More precisely, the cover component 19 is situated on faces 5 of the strap segments 4, which extend essentially at right angles to the friction surface 3 of the counter-pressure plate 2. In this case, the cover component 19 is in direct contact with the corresponding faces 5 of the strap segments 4.

A hole, preferably a blind hole 6, is made in the face 5 of the respective strap segment 4. In particular, this blind hole 6 is punched in the axial direction A of the clutch device 1 without machining, using an awl. By means of a screw 22, preferably self-tapping, which is screwed into the blind hole 6, the cover component 19 is connected to the counter-pressure plate 2, more precisely to the strap segments 4 of the counter-pressure plate 2.

The strap segments 4 extend through the contact plate 7 in the axial direction A outside of the contact-plate friction surface 8. To this end, apertures 12 are provided in the contact plate 7 outside of the contact plate friction surface 8, which correspond in number and position to the number and position of the strap segments 4 of the counter-pressure plate. The apertures 12 are thus likewise positioned at uniform intervals from each other on a circular path in the circumferential direction U. In order to transmit the torque from the counter-pressure plate 2 to the contact plate 7, edges of the apertures 12 are in contact with flanks of the relevant strap segments 4 which are opposite each other in the circumferential direction U, preferably by clearance fit.

Furthermore, in the depicted exemplary embodiment, the contact plate 7 has an encircling outer collar segment 9 running in the circumferential direction U, as well as an encircling inner collar segment 10 running in the circumferential direction U. Both collar segments 9, 10 serve to stiffen the contact plate 7, and make it possible to produce the contact 7 from a metal sheet, in particular a sheet steel blank, by means of shaping.

Inside the outer collar segment 9 in the radial direction R, the contact plate 7 assembly is provided with openings 13, in order to enable access to the aforementioned fastening segments for an assembly tool from the direction of the actuator device, without having to disassemble the clutch device 1. The assembly openings 13 are situated between the apertures 12 in the circumferential direction U.

In the same way, the cover component 19 may also have recesses or apertures for the assembly tool in the area of the assembly openings 13 in the contact plate. In the depicted exemplary embodiment, these recesses are designed as indentations in the radial direction, so that the ring-shaped cover component 19 has an essentially star-shaped outside contour.

Each of the strap segments 4 of the counter-pressure plate 2 extends in the axial direction A, through the relevant lever element 16. To this end, in the depicted exemplary embodiment each of the lever elements 16 has two lever arms 17 spaced apart from each other in the circumferential direction U, which extend essentially in the radial direction R. The lever arms 17 are situated in the radial direction R outside of the lever tongues of the relevant lever element 16, and are in contact, preferably by means of clearance fit, at least in the circumferential direction U, with the flanks of the relevant strap segment 4 which lie opposite each other in the circumferential direction U. Thus at least an alignment of the lever elements 16 in the circumferential direction U is possible, while transmission of the torque to the lever elements 16 is possible in addition.

In addition to the two lever arms 17, in the depicted exemplary embodiment each of the lever elements 16 has a spring segment 18 which is situated between the two lever arms 17, and which, like the two lever arms 17, extends from the lever tongue in the radial direction. The spring segment 18 has greater elasticity than the rest of the lever element 16, that is, in particular the lever arms 17 and the lever tongue. To pre-tension the lever element 16 and/or to center the lever element 16, the spring segment 18 is engaged with the cover component 19. In particular, each of the lever elements 16 is secured against loss by the cover component 19, while in the depicted exemplary embodiment the cover component 19 has an engagement opening 20 in the vicinity of each of the screws 22, more precisely, on the same radial lines as the screws 22. At its free end, the spring segment 18 of the respective lever element 16 is provided with a hook segment, which engages securely with the engagement opening 20. Other types of the loss prevention device are also possible however, in particular in order to simplify the assembly of the clutch device 1.

Furthermore, the ring-shaped cover component 19 has centering segments 21 which extend in the axial direction A and/or in the radial direction R, preferably inward, in order to center the respective lever element 16. In the depicted exemplary embodiment, the respective centering segment 21 engages between the two adjacent lever arms 17 of the relevant lever element 16, preferably by means of clearance fit, in particular in order to enable transmission to the lever elements 16 of the torque transmitted from the counter-pressure plate 2 to the cover component 19.

Although this is not shown, it is also possible for each of the lever elements 16 to have, for example, only a single lever arm 17 and/or two or more spring segments 18. In particular, it is possible for a lever arm 17 to be situated between two adjacent spring segments 18 of a lever element 16 in the circumferential direction U.

The free ends of the lever arms 17 of the respective lever elements 16 engage with the contact plate 7, more precisely with the outer collar segment 9 of the contact plate 7. To this end, the outer collar segment 9 of the contact plate 7 has engagement openings 11, with whose edges lying opposite each other in the circumferential direction U corresponding edges of the lever arms 17 are in contact, preferably by clearance fit. This too may enable transmission of the torque from the lever elements 16 to the contact plate 7. Furthermore, the top sides of the lever arms 17 are in contact with the undersides of the engagement openings 11, so that in addition to stiffening the contact plate 7 the collar segment 9 also has the function of a lifting anchor in a normally engaged clutch device 1, depicted in the exemplary embodiment.

Situated in the axial direction A between the lever elements 16 and the contact plate 7 is a ring-shaped diaphragm spring 23, to pre-tension the contact plate 7 in the axial direction A. The diaphragm spring 23 is designed to press the lever elements 16 and the contact plate 7 against each other, so that when the normally engaged clutch device 1 depicted in the exemplary embodiment is in the non-actuated state, the contact plate 7 is in frictional contact with the friction linings 27 of the clutch plate 26, in order to transmit the torque from the input side of the clutch device 1 to the output side of the clutch device 1, that is, to the hub 28 of the clutch plate 26. The radially outer region 24 of the diaphragm spring 23 is in contact with the lever elements 16, more precisely with the lever arms 17 of the lever elements 16, while the radially inner region 25 of the diaphragm spring 23 is in contact with the contact plate 7, more precisely with the surface of the contact plate 7 lying opposite the friction surface 8 in the axial direction A. The contact plate 7 is preferably equipped in this area with at least one ring-shaped bead 14, in the depicted exemplary embodiment a plurality of ring-segment-shaped beads 14 spaced apart from each other in the circumferential direction U. The inner region 25 of the diaphragm spring 23 can thus roll over these beads 14 when the clutch device 1 is actuated.

Furthermore, in the exemplary embodiment the inner collar segment 10 of the contact plate 7, which is designed inside the beads 14 in the radial direction R and adjacent to them, is equipped with a plurality of centering segments 15, which are in contact with the inner edge of the ring-shaped diaphragm spring 23, which is in contact with the inner region 25 of the diaphragm spring 23, or may be brought into contact with it when the clutch device 1 is actuated, in order to center the diaphragm spring 23.

The preceding exemplary embodiments relate to a clutch device 1, in particular for a drivetrain of a motor vehicle, having a counter-pressure plate 2 and a contact plate 7 which is movable to a limited extent in axial direction A of the clutch device 1 by at least one lever element 16 to clamp a clutch plate 26 frictionally between the counter-pressure plate 2 and the contact plate 7, wherein the counter-pressure plate 2 has at least one strap segment 4 extending essentially in the axial direction A, to which a cover component 19 is connected.

REFERENCE LABELS 1 clutch device
2 counter-pressure plate
3 friction surface
4 strap segment
5 face
6 blind hole
7 contact plate
8 friction surface
9 outer collar segment
10 inner collar segment
11 engagement opening 12 aperture
13 assembly opening
14 bead
15 centering segment
16 lever element
17 lever arm
18 spring segment
19 cover component
20 engagement opening
21 centering segment
22 screw
23 diaphragm spring
24 outer region
25 inner region
26 clutch plate
27 friction lining
28 hub
29 damping device
A axial direction
R radial direction
U circumferential direction

The invention claimed is:

1. A clutch device, comprising a counter-pressure plate and a contact plate which is movable to a limited extent in an axial direction A of the clutch device by at least one lever element to clamp a clutch plate frictionally between the counter-pressure plate and the contact plate, the counter-pressure plate has at least one strap segment extending essentially in the axial direction (A), to which a cover component is connected, wherein the strap segment extends through an aperture in the contact plate in the axial direction (A), and the strap segment is in contact with the contact plate in the aperture to transmit torque to the contact plate.

2. The clutch device according to claim 1, wherein the counter-pressure plate has a friction surface, with which the clutch plate is brought into frictional contact when the clutch device is engaged, and the cover component is situated on a face of the strap segment, which extends essentially at right angles to the friction surface of the counter-pressure plate and is produced by shaping.

3. The clutch device according to claim 2, wherein a hole is made in the face of the strap segment, by which the cover component is connected to the counter-pressure plate.

4. The clutch device according to claim 3, wherein the cover component is connected to the counter-pressure plate by a screw inserted into the hole.

5. The clutch device according to claim 1, wherein the counter-pressure plate has a plurality of strap segments spaced apart from each other in a circumferential direction (U) of the clutch device, which are formed in a single piece with the counter-pressure plate and are arranged on a circular path.

6. The clutch device according to claim 1, wherein the strap segment extends through the lever element in the axial direction (A), and the lever element is aligned, at least in a circumferential direction (U), through contact with the strap segment.

7. The clutch device according to claim 1, wherein the lever element has at least one spring segment, which is engaged with the cover component to at least one of pre-tension the lever element or to center the lever element.

8. The clutch device according to claim 1, wherein the cover component is ring-shaped design, and at least one centering segment extending in at least one of the axial direction (A) or in a radial direction (R) of the clutch device, which centers the lever element, is provided on the cover component.

9. The clutch device according to claim 1, wherein the lever element has at least one lever arm, which, to disengage the clutch device, engages with the contact plate, with a collar segment of the contact plate which is formed radially outwardly extends in the axial direction (A) and is produced by shaping.

10. The clutch device according to claim 1, wherein a ring-shaped diaphragm spring is situated between the lever element and the contact plate to pre-tension the contact plate in the axial direction (A), and a radially outer region of the diaphragm spring is in contact with the lever element and a radially inner region is in contact with the contact plate, while the diaphragm spring is centered by a collar segment of the contact plate which is formed to an inside in the radial direction (R), extends in the axial direction (A), and is produced by shaping.

* * * * *